Aug. 9, 1938.  W. T. DEAN  2,126,095
SOAKING PIT AND LIKE HEATING FURNACE
Filed Oct. 12, 1936   2 Sheets-Sheet 1
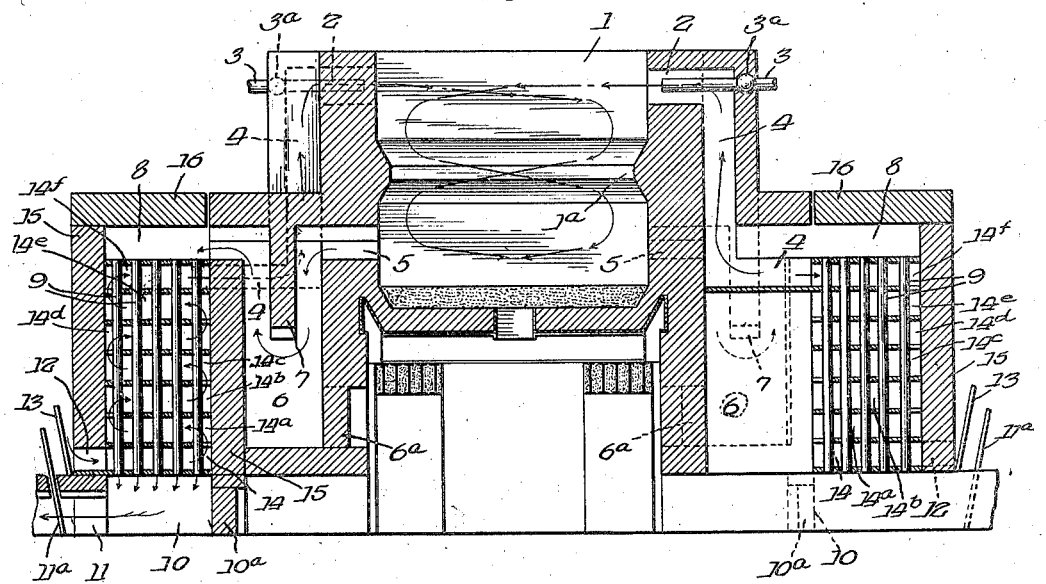
Inventor:
William T. Dean
By Usina & Rauber,
Attys

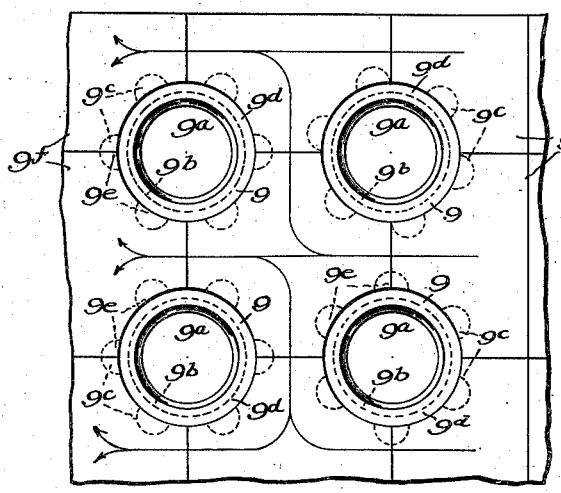
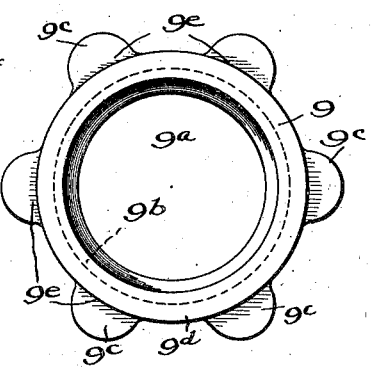
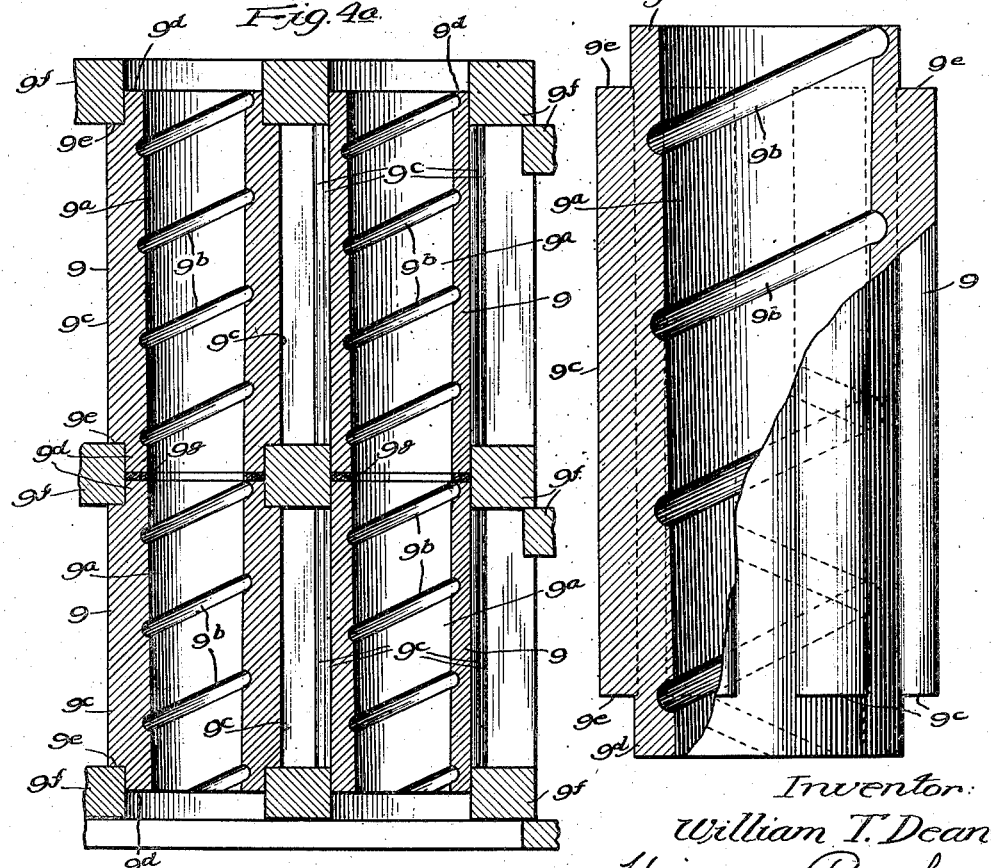

Patented Aug. 9, 1938

2,126,095

UNITED STATES PATENT OFFICE 2,126,095

SOAKING PIT AND LIKE HEATING FURNACE

William T. Dean, Gary, Ind.

Application October 12, 1936, Serial No. 105,336

20 Claims. (Cl. 263—15)

This invention has to do with certain improvements in the construction of soaking pits, and particularly recuperative pits wherein the air for combustion is preheated in recuperators through which the waste gases from the pits are circulated under pressure generated by stack draft, sometimes assisted by slight air pressure, as distinguished from regenerative pits wherein the air is heated by alternate use of two sets of checkers, one being heated by waste gases whilst the other is giving up heat to the air stream. This invention also has to do with certain essential parts of soaking pit appurtenances, including among others covers or doors and the means for retracting the same; recuperators constructed to afford more efficient heat transfer; means for controlling and properly proportioning the flow of fuel, air and waste gases; and methods of construction so as to greatly increase the working life of soaking pits and appurtenances thereto.

In order that the features of the invention may be better understood, I will first explain some of the operating problems incident to pits of this character as heretofore constructed. Such pits are usually constructed in batteries of several holes, rectangular in shape and provided with retractable covers or doors to allow access to the top of the pit for charging or drawing steel ingots or blooms which are placed vertically therein. It has been the practice to fire such pits with one or more burners for gas or liquid fuel, all burners being located near the top and at one end of the pit. Ports are provided for exit of the burned gases at the same end with the burners but located near the bottom of the pit. The hot waste gases are led directly to and through a bank of fire-clay tile recuperators so assembled as to provide horizontal passages for the waste gases and vertical passages for the incoming combustion air. The waste gas passages extend alternately back and forth across, and so cause these gases to traverse the bank of recuperators one or more times, the recuperators being accordingly designated as "one pass", "two pass", "three pass", etc. From the lowest and last pass of the recuperator bank the gases are led past a controlling damper into a stack. Usually the stack serves as the sole means for moving the air and gases.

Incoming cold air for combustion flows through complementary recuperator passages, controlled by an intake damper, thence through ports surrounding the fuel burners and into the pit, being impelled mainly by the stack draft. The flow of the air that enters by way of the recuperators is assisted somewhat by the inspirator action of the fuel nozzles delivering into concentric nozzles which carry small amounts of cold air supplied by a fan and serving as a carrier and distribtor for the fuel.

Control of the several dampers and the fuel valves being manual, leaves much of the needed balance of draft, fuel and air to chance or time-consuming skill.

The depth of pits is determined by the length or height of the ingots to be charged plus sufficient clearance above the ingot tops to avoid direct flame impingement on the steel. On account of the increasing use of hot-top ingots, it is not always possible to maintain this clearance, particularly with pits constructed with fixed nozzles limiting the flame delivery to a single direction.

In the operation of furnaces as above set forth, the flames enter the pit near its top at one end, traverse a U shaped path across the pit, down its back wall and thence back to exhaust ports beneath the nozzles, with the result that the upper ends of the ingots, although heated largely by convection, are subjected to the highest temperature. The lower portions of the ingots are heated to a lesser extent, even though heated by convection, supplemented by primary radiation from the pit walls, secondary radiation from adjacent ingots, and to a large extent by conduction downwards from the superheated tops. From this it becomes apparent that a stiff temperature gradient exists from the top downwards in pits fired in this manner. In actual practice, it is found necessary to allow considerable soaking or dampering time to permit the heat to travel downwards through the ingots; "dampering time" alluding to the time during which all fuel as well as air and stack dampers are kept closed. During the dampering period, the pit as well as the ingot top is dropping in temperature, and this loss must be made up by subsequent firing. Obviously, all dampering time is lost time, reducing the capacity of the pit and wasting fuel to the extent of radiation losses and the amount of fuel needed to return the pit to its proper working temperature. Further, the time and manual labor involved in operating valves and dampers limits the useful activity of the heater.

A further difficulty met in operating pits of the kind above referred to, lies in the unevenness in the temperatures of different parts of the pit generated by firing from one end only and removing the waste gases from one end only. Still another disadvantage encountered is the short life of the fire-clay recuperator tile, which are necessarily thin walled on account of limitations as to space and heat conductivity. Low rates of heat flow through such tile walls enforce large heating surfaces. By reason of the limitations cited, the recuperator cell approximates the dimension of the pit proper. On account of the physical nature of the clay tile, the recuperators must be assembled from a great number of small pieces of tile, all laboriously fitted and cemented together with a highly refractory cement. When the recuperator so constructed is once thoroughly heated, it becomes a honeycombed monolith of vitrified clay and thereafter remains susceptible to serious damage in cooling and heating. When flue gases from the pit carry carbon, silica, alumina and iron oxides in dust form and pass through horizontal passages at velocities constantly decreasing as the gases cool, their solids are deposited in these horizontal passages. Owing to the temperatures and the alternately reducing and oxidizing atmospheres prevailing, the deposits are soon converted into low melting slags which attack the clay walls of the recuperator tile. In a few months, the thin walls are destroyed and the slag dissolves the cement between sections of tile and trickles down and clogs the lower passages, where temperatures are low enough to solidify the slag. This action is cumulative and accelerated by formation of local hot spots. Some of the flue dirt is carried further along the passages and into lower sections where, at very low velocities there prevailing, it drops out of the gas stream and eventually chokes the last passes with iron oxides. When a fault develops in the tile structure, the entire recuperator must be replaced, as partial replacement is impossible. Neither the waste gas nor the air velocities are even approximately constant; hence, aside from deposits, the heat transfer is not uniform nor efficient.

Retractable covers or doors as heretofore built leave much to be desired in point of life and insulation. Where such covers are supported by a truck carried on rails along the side of the pit, sufficient space for overlap is lacking; the view of the pit by the craneman is limited; and high cover and pit top repairs follow. Where the covers are carried on trucks, it is impossible to secure good sealing because if the cover be lowered to seat well, the weight is off the axles and no traction remains. Unless covers are well sealed, they permit serious heat losses as well as infiltration at times and damage to the cover edge castings and channeling of pit tops. For small pits, covers may be made with a cast steel frame lined with a spherically shaped arch of fire brick. For large pits, however, it is necessary to use structural cover frames, for which spherical arches are not suitable because of the difficulty of providing for the arch thrusts and because of the volume of space formed beneath such arches. This has forced the use of flat or suspended arches of refractory units, supported by special hanger castings that rest upon the structural frame members. This type of cover is expensive in first cost and short lived because there is no means of keeping the brick elements tight, and further insulation cannot be applied as the hanger castings become overheated. The racking of such covers due to movements accentuate the difficulties.

Among the objects of the present invention are to increase convection heating; flatten the temperature gradient within the pit; afford better heat distribution; reduce wasted damper time; prolong continuous firing periods; reduce recuperator space requirements; increase recuperator life; afford more ready access to recuperators for inspection and cleaning; eliminate thermal expansion cracks in recuperators; provide for partial repairs to recuperators; reduce the time needed for heating and cooling pits; increase the efficiency of recuperation; eliminate stratification of air and gases; render burners universally adjustable; simplify the control of valves and dampers; provide means for insuring correct fuel-air ratio at all times; provide a multiple arched cover which may be insulated; cause the cover to remain tight in spite of movements; reduce the number of special brick shapes required; eliminate hanger castings susceptible to damage by heat; provide means for lowering and sealing covers on pit tops; avoid the use of retracting mechanism in hot zones; and eliminate hydraulic cover operating mechanism. Other objects will appear from this specification and the sub-joined claims.

In the accompanying drawings which illustrate preferred embodiments of the several parts of the present invention—

Figure 1 is a vertical section through, and Figure 2 a plan view of the improved soaking pit minus its cover and showing the relative positions of the recuperators, the burners and the deflecting baffle walls, as well as a trajectory that can be imparted to the flame.

Figures 3 and 3a show on an enlarged scale, respectively, in plan and sectional side elevation, an internally rifled replaceable recuperator tile.

Figures 4 and 4a show on a smaller scale, respectively, in plan and in vertical section, a partial assembly of recuperator tile shown in Figures 3 and 3a, through which hot gases flow vertically and around which combustion air, to which heat is to be transferred, circulates horizontally.

Referring to Figures 1 and 2, 1 represents the pit having intake ports 2 at opposite ends of its upper portion for a combustible mixture consisting of a fluid medium entering through burners 3, and pre-heated combustion supporting air flowing through uptake passages 4; and 5 represents exhaust ports located at opposite ends of the lower portion of the pit and through which hot gases flow into precipitating chambers 6 rendered circuitous by depending baffles 7 and from which the hot gases, minus such suspended solids as may be deposited in the bottom thereof, escape into a manifold chamber 8 communicating with all of a series of vertical recuperator tile 9 to a manifold or collecting chamber 10, whence said gases escape through flue 11 controlled by damper 11a to a stack, not shown. Air for support of combustion enters through a port 12 under control of damper 13 into the lowermost section of a group of zig-zag or circuitous horizontal passes represented by 14, 14a, 14b, 14c, 14d, 14e and 14f, each of which presents the air to the external walls of refractory recuperator units through which hot gases flow vertically downward, as already described, and from the last-named pass 14f of which heated combustion air flows horizontally to the passage 4 already referred to. The hot gas and air passages thus far described are duplicated on opposite sides of the pit.

As shown by the arrows, which indicate directions of flow of flames, exhaust gases and incoming combustion air in Figure 1, the flames from one burner 3 tend to follow a path typified by an upstanding letter S, while those from the other burner 3 traverse a reversed upstanding letter S, these courses being aided by a corbelled breast 1a in the pit walls which may also serve as a support for such ingots as will not stand on end or cannot be otherwise held in a vertical position. The waste gases enter the recuperator cell or manifold 8 horizontally after having changed direction four times and after having passed through a low velocity zone beneath the baffle wall in which most of the solids will have been thrown out of the gas stream into the slag pocket. Further, the gases are well mixed by impingement on the baffle wall and change in direction so that stratification and consequently critical hot spots are eliminated. The described disposal of hot gases also eliminates cool areas heretofore found near the exhaust ports.

While the waste gases enter the recuperator manifold cell horizontally, they must mix and change direction again to travel vertically downwards through the recuperator passages 9. Hence, any solids remaining in the flue gases will be carried down with the gas stream, assisted by gravity, and finally be deposited in the lower manifold or cleanout chamber 10.

As shown in Figures 3, 3a, 4 and 4a, the recuperator tile 9 have bores 9a that are circular in section, and these bores have no obstructions other than rifling lands 9b, and their inner diameters gradually decrease as the gases cool so as to maintain substantially constant velocity of flow therethrough. The purpose of rifling the tile inside is to impart a circular whirl or vortical action to the gases, thus insuring that all portions of the gas stream wipe over the heat absorbing surface of the tile and rendering unnecessary the use of obstructions such as so called "core busters" for that purpose. It will be noted that a bulkhead cleanout 6a is provided for the hot slag pocket 6; also a bulkhead cleanout 10a for the dust catcher beneath the recuperators, thus providing for cleaning out without cooling down the pit.

By again referring to Figure 1 and the S or reversed S paths of the burning gases, it will be seen that increased convection heating is accomplished by the re-circulation of the flames three times across the pit 1 and thereby wiping the ingot surfaces a plurality of times. These paths of the gases are effected by the corbels 1a shown assisted by the location of the exhaust ports 5. Since two oppositely disposed flames issue from burners 3 through fuel ports 2, these flames will promote the above-mentioned re-circulation and set up, about the charge, whorls which also promote re-circulation. Since the flames travel normally in opposite directions, any tendency toward localized overheating is neutralized at once by mutual radiation from an incipient hot zone to an adjacent cooler zone, as well as by direct convection heat transfer. The direction of the flames and arrangement of the corbels and ports of the pit increase convection heating, level the heat gradient, provide better distribution, reduce dampering time, and permit longer direct firing periods—all of which are elements increasing the economy and capacity of the pit.

In Figure 2, which shows a plan view of one end of the pit, may be seen the relative positions of the burners and the ports.

Again referring to the recuperator, the tiles, as will be seen from Figure 3, are circular in form with external corrugations 9c to increase their heating surfaces and stir the air that circulates around them when they are assembled in the arrangement shown in Figures 4 and 4a. But these external corrugations are omitted at each end of each tile to leave reduced ends 9d and shoulders 9e which serve to fit them and to support the fire brick baffle tile 9f which maintain the relative positions of the recuperator tile and, by serving as horizontal air baffles, deflect the flow of incoming air from stage to stage, as explained in connection with Figure 1. The length chosen for the sections of recuperator tile 9 fixes the spaces between these horizontal air baffles 9f to provide substantially constant velocity for the air as its temperature rises. The recuperator tile are, as shown in Figure 4a, stacked one upon another vertically with all joints horizontal and cemented, as suggested at 9g, by suitable refractory cement. The weight of each column is carried independently of all other columns and of the cell walls 15. The strength of each column against crushing increases as the weight increases by reason of the corresponding temperature drop.

The air is transferred from one stage to the next by omission of baffle tile at the points of transfer alternately on opposite sides of the cell. This construction eliminates danger from heat strains in the tile and permits replacement of upper stages of tile when and if necessary without destruction of lower sections.

16 represents a removable cover that gives access to the top of the recuperator cell 8 for inspection and cleaning, without disturbing the flue connections. By constructing the recuperator tile 9 and 9f from highly heat conducting as well as highly refractory materials such as aluminum oxide and/or silicon carbide, the total heating surface needed may be reduced in proportion to the higher conductivity of the material selected. For example, it might be desirable to equip the first hot stage with aluminum oxide tile, which are highly slag resistant, and later stages with silicon carbide tile, which are less slag resistant but better conductors for heat.

The horizontal flow of air around the recuperator tile is not objectionable since it carries no dirt. On the contrary, it is advantageous since the air is thoroughly mixed from stage to stage, thereby preventing local hot spots or stratification. No surfaces are left exposed to severe heating without counterflow of cooling air, thus insuring long life for the baffles and the entire recuperator structure. Because of the highly refractory nature of the chosen recuperator tile material and its resistance to spalling, pits may be heated or cooled as rapidly as desired, subject to limitation by the properties of the lining used for the pit proper. This provides for rapid cooling when necessary for charging cold high carbon steel and also gives a heretofore unknown degree of flexibility to a soaking pit plant, for a group of pits may be laid off or put in service as frequently and as rapidly as needed to meet the varying demands for capacity. It will be noted that the recuperator cells are in duplicate, but oppositely disposed to suit the waste gas ports. Thus space becomes available at opposite corners of the pit for fuel burners firing through short hot air ports, permitting the use of short burners, easily inspected, cleaned or replaced, and susceptible of swivel mounting in universal joints 3a for any desired angle of firing.

I claim:

1. A soaking pit or reheating furnace, comprising a pit provided with two fuel burners disposed in upper portions of opposite walls of said pit and at diagonally opposite ends thereof, corbels extending along intermediate levels in said opposite walls, and exit ports through said opposite walls, in opposite ends of the pit near its bottom.

2. A soaking pit or reheating furnace as described in claim 1, having in line of discharge through its exit ports, a baffle which deflects the course of the discharged gases, and a collecting pit beneath said baffle for solids precipitated from said gases.

3. A soaking pit or reheating furnace according to claim 1, which also includes baffles in line of discharge through its exit ports, a percipitating chamber beneath said baffle collecting solids deposited by gases from the pit, a mixing chamber, and a recuperator through which waste gases after they leave the precipitating chamber flow in a substantially vertical direction and downwardly.

4. A furnace as described in claim 1, which includes a recuperator in line of flow from the exit ports and to which waste gases flow in a substantially horizontal direction; said recuperator having downwardly directed substantially vertical gas passages into which waste gases flow with change of direction from their substantially horizontal approach, and having a plurality of substantially horizontal air passages connected alternately at opposite ends and through which combustion-supporting air flows on its way to the pit.

5. A furnace of substantially the character described, comprising a heating pit, burner nozzles directed in substantially opposite directions from diagonally opposite sides of said pit and at opposite ends thereof, deflecting corbels on opposite sides of said pit at an intermediate level thereof, and exits from said opposite sides of the pit near the bottom thereof and at opposite ends of the pit.

6. In a furnace as described in claim 1, refractory baffle walls placed opposite the exit ports and serving as heat reflectors counteracting the loss in radiating pit surface due to the area of the exit ports.

7. A recuperator for furnaces embodying in its construction hollow circular cores tapered in diameter in the direction of flow of gases therethrough.

8. A recuperator of substantially the character described, embodying in its construction hollow tile tapered in internal diameter and formed with rifling lands.

9. A soaking pit or reheating furnace, comprising a pit provided with fuel burners disposed at the top of opposite walls of said pit and exit ports through said opposite walls, adjacent the bottom thereof, the burner and exit port in each of said walls being diagonally disposed, and the burner and exit port of one wall both being disposed diagonally with respect to the burner and exit port, respectively, of the other wall.

10. A soaking pit or reheating furnace as described in claim 9, having in line of discharge through its exit ports, a baffle which deflects the course of the discharged gases, and a collecting pit beneath said baffle for solids precipitated from said gases.

11. A soaking pit or reheating furnace as described in claim 9, which also includes baffles in line of discharge through its exit ports, a precipitating chamber beneath said baffle collecting solids deposited by gases from the pit, a mixing chamber, and a recuperator having downwardly extending passages connected to said mixing chamber for the downward discharge of waste gases.

12. A soaking pit or reheating furnace as described in claim 9, which includes a recuperator in line of flow from the exit ports and to which waste gases flow in a substantially horizontal direction, said recuperator having downwardly directed substantially vertical gas passages connected to one of said exit ports and into which waste gases flow with change of direction from their substantially horizontal approach, and having a plurality of substantially horizontal air passages connected alternately at opposite ends and communicating with the pit and through which combustion-supporting air flows on its way to the pit.

13. A soaking pit or reheating furnace, comprising a pit provided with fuel burners disposed in the upper portions of opposite walls of said pit, and exit ports through said opposite walls, corbels extending along intermediate levels in said opposite walls, the burner and exit port in each of said walls being diagonally disposed and the burner and exit port of one wall both being disposed diagonally with respect to the burner and exit port of the other wall.

14. A soaking pit or reheating furnace as described in claim 13, having in line of discharge through its exit ports, a baffle which deflects the course of the discharged gases, and a collecting pit beneath said baffle for solids precipitated from said gases.

15. A soaking pit or reheating furnace as described in claim 13, which also includes baffles in line of discharge through its exit ports, a precipitating chamber beneath said baffle collecting solids deposited by gases from the pit, a mixing chamber, and a recuperator having downwardly extending passages connected to said mixing chamber for the downward discharge of waste gases.

16. A soaking pit or reheating furnace as described in claim 13, which includes a recuperator in line of flow from the exit ports and to which waste gases flow in a substantially horizontal direction, said recuperator having downwardly directed substantially vertical gas passages connected to one of said exit ports and into which waste gases flow with change of direction from their substantially horizontal approach, and having a plurality of substantially horizontal air passages connected alternately at opposite ends and communicating with the pit and through which combustion-supporting air flows on its way to the pit.

17. A soaking pit or reheating furnace comprising a substantially rectangular pit in horizontal section provided with oppositely disposed walls, burners located in a pair of oppositely disposed walls and adjacent the top of said pit and positioned to discharge combustion gases in oppositely disposed and horizontally spaced streams, means for taking off combusted gases adjacent the bottom of the pit, and means disposed intermediate of the top and bottom of the pit for reducing the horizontal area and causing the gases from an upper level to travel inwardly.

18. A soaking pit or reheating furnace comprising a substantially rectangular pit in horizontal section provided with oppositely disposed walls, burners located in a pair of oppositely disposed walls and adjacent the top of said pit and positioned to discharge combustion gases in oppositely disposed and horizontally spaced streams, means for taking off combusted gases adjacent the bottom of the pit, and means disposed intermediate of the top and bottom of the pit for causing the gases from an upper level to travel inwardly.

19. A recuperator for furnaces embodying in its construction hollow circular cores tapered in diameter in the direction of flow of hot gases therethrough and each of which has on its external surface longitudinal corrugations.

20. A recuperator for furnaces embodying in its construction hollow tile tapered in internal diameter in the direction of flow of hot gases therethrough and formed with rifling lands and provided on its external surface with longitudinal corrugations.

WILLIAM T. DEAN.